Dec. 10, 1963 P. G. VICARD 3,113,593
DEVICES FOR MINIMIZING LOSSES IN FLUID CONDUITS
Filed May 21, 1962
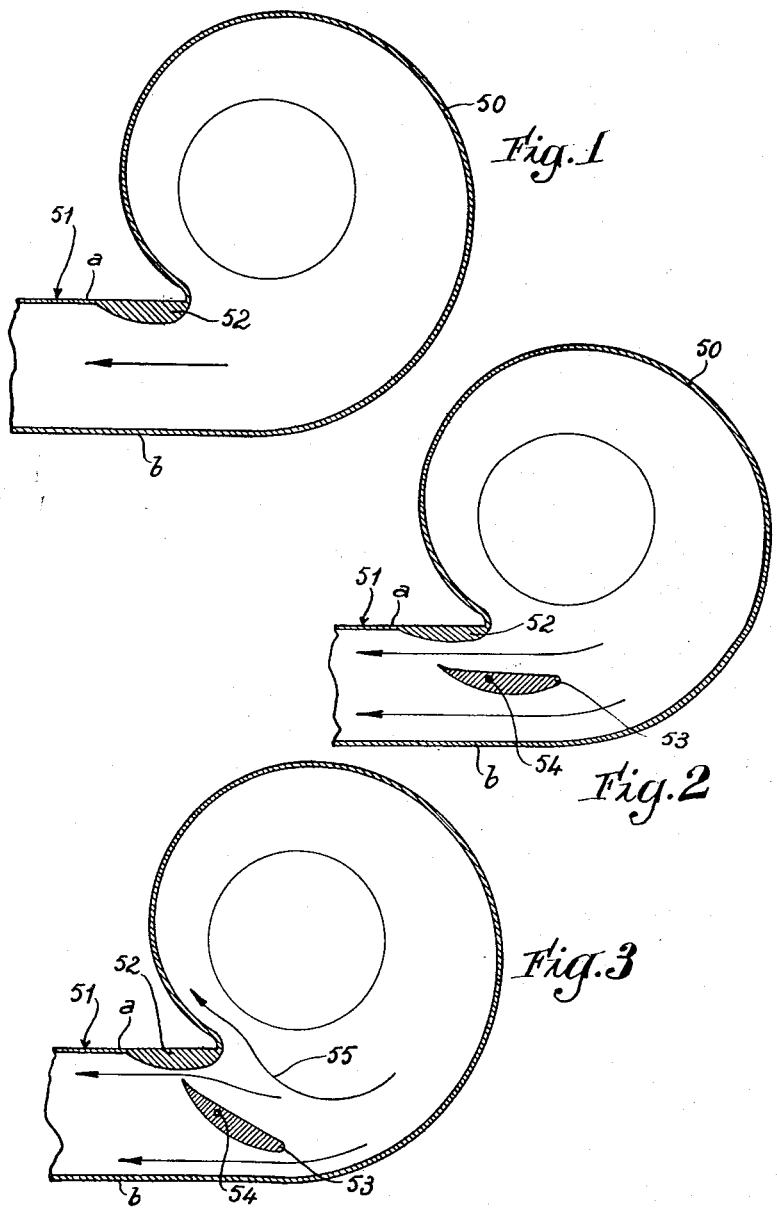
INVENTOR
Pierre Georges Vicard
BY Alexander H. Dowell
ATTORNEYS 3,113,593
DEVICES FOR MINIMIZING LOSSES IN FLUID CONDUITS
Pierre Georges Vicard, 15 Cours Eugenie, Lyon, France
Filed May 21, 1962, Ser. No. 196,338
Claims priority, application France June 1, 1961
4 Claims. (Cl. 138—39)

The present invention refers to the flow of fluids (this term including gases and liquids) along non-rectilinear paths.

In my prior patent application Serial No. 18,615, now Patent No. 3,076,480, I have described a device adapted to minimize power losses in a conduit or the like at the passage from a circular path to a rectilinear path and vice versa comprising a vane having the contour of the low pressure side of an aircraft wing disposed against the inner side of the conduit, i.e., on the side thereof nearest to the center of the arcuate portion of the conduit. With such a device the flow of the fluid passes regularly from the irrotational regime in the arcuate portion of the conduit to the uniform velocity regime in the rectilinear portion of the said conduit.

In accordance with the present invention there is provided in the conduit in addition to the above-mentioned vane or stationary vane, at least one additional movable vane so arranged as to form a butterfly valve to control the fluid passage between the stationary vane and the side of the conduit opposed thereto.

The device according to the present invention is more particularly of advantage at the outlet of a centrifugal apparatus where it minimizes losses due to the passage of the fluid from a circular path within the apparatus itself to a rectilinear path in the tangential outlet conduit thereof.

In the annexed drawing:

FIG. 1 diagrammatically illustrates an arrangement in accordance with the above-mentioned patent application.

FIG. 2 is a diagrammatical section of a device according to the present invention, the movable vane being shown at the fully open position.

FIG. 3 is a view similar to FIG. 2, but illustrating the movable vane at a partly closed position.

In FIG. 1 reference numeral 50 designates the spiral-shaped casing of a centrifugal apparatus, such as a blower. The fluid within this apparatus flows more or less according to the so-called irrotational regime, at least in the peripheral portion of casing 50 where it is no more submitted to the direct action of the rotor of the apparatus when such a rotor exists (as for instance in the case of a blower). Casing 50 has a tangential outlet 51 in the form of a substantially rectilinear conduit. In order to avoid power losses in the fluid at the passage thereof from the circular path within casing 50 to the rectilinear path in conduit 51 a vane 52 is disposed against the inner side $a$ of the said conduit (i.e., the side thereof nearest to the center of casing 50), just at the inlet thereof, the exposed side of the said vane having the contour of the low-pressure side of an aircraft wing. This vane, which in fact only acts on the fluid by its exposed side, transforms the irrotational regime of the fluid flow into a rectilinear uniform regime, thus avoiding, or at least minimizing, the formation of eddies and the resulting power losses. It is recalled in this connection that in the irrotational regime the velocity of the fluid is inversely proportional to the radial distance (i.e., the distance between each fluid layer within casing 50 and the center of the said casing), while in the rectilinear uniform regime the velocity is constant in any plane transverse to the conduit (here conduit 51).

In accordance with the present invention there is provided in conduit 51 an additional vane 53 having the full contour of an aircraft wing, the said vane being carried by a transverse spindle 54 so as to be angularly adjustable in the said conduit in the vicinity of the stationary vane 52, and in such a manner as to form a butterfly or throttle valve between the said stationary vane 52 and the outer side $b$ of conduit 51.

When the adjustable vane 53 is substantially parallel to the stationary vane 52, as shown in FIG. 2, its convex side, i.e., the side corresponding to the contour of the low-pressure side of an aircraft wing, acts on the portion of the fluid which flows between the said vane and the outer side $b$ of conduit 51, while the stationary vane 52 acts for its own part on the portion of the fluid which flows between the said stationary vane 52 itself and the concave or high-pressure side of the adjustable vane 53. The fluid thus passes quite regularly from the irrotational regime to the rectilinear uniform regime. The cross-sectional area through which the fluid may pass is also at its maximum.

When the movable vane 53 is set at an angle, as shown in FIG. 3, the cross-section of the fluid passage between the stationary vane 50 and the opposed side $b$ of conduit 51 is reduced, vane 53 acting as a butterfly or throttle valve and the output of the blower or like centrifugal apparatus is thereby also reduced. As long as the obliquity of vane 53 is moderate the said vane still acts as an aircraft wing and transforms, at least in part, the irrotational flow of the fluid within casing 50 into a uniform rectilinear flow in conduit 51.

Of course when the angle of obliquity of vane 53 with respect to the longitudinal axis of conduit 51 is too great, the stream lines no more follow the surface of the vane and eddies appear, as in the case of an aircraft wing set at a too great angle of pitch. But in actual practice this only occurs to a substantial degree when the flow is quite reduced, i.e., when power losses become of smaller importance.

It will be understood that instead of a single adjustable vane such as 53, there could be provided a plurality of such vanes appropriately disposed in the conduit 51, as for instance with their spindles substantially disposed in a common plane transverse to the conduit.

I claim:

1. A device to minimize losses in a fluid conduit at the passage from a first section in which the fluid follows a substantially circular path about a center, to a second section in which the fluid follows a substantially rectilinear path substantially tangential to said circular path, or vice versa, comprising a stationary vane disposed against the side of said second portion of said conduit nearest to the center of said circular path in close proximity to the end of said second section nearest to said first section, the exposed side of said vane element having the contour of the low-pressure side of an aircraft wing; at least one movable vane having the full contour of an aircraft wing, disposed in said conduit between said stationary vane and the opposed side of said conduit; and means to angularly adjust said movable vane in said conduit about a transverse axis between a first position for which said movable vane is substantially parallel to said stationary vane and leaves substantially free passage to the fluid and a second position for which said movable vane is substantially transverse with respect to said conduit to restrict passage of the fluid between said stationary vane and the opposed side of said conduit.

2. In a device as claimed in claim 1, said movable vane being mounted on a transverse spindle so as to act as a throttle valve in said conduit.

3. A fluid apparatus comprising a substantially circular casing in which a fluid follows a substantially circular path about the center of the said casing; a straight conduit opening tangentially in said casing; a stationary vane disposed against the side of said conduit nearest to the center of said casing substantially at the end of said conduit nearest to said casing, the exposed side of said stationary vane having the contour of the low-pressure side of an aircraft wing; at least one movable vane having the full contour of an aircraft wing, disposed in said conduit between said stationary vane and the opposed side of said conduit; and means to angularly adjust said movable vane in said conduit about a transverse axis between a first position for which said movable vane is substantially parallel to said stationary vane and leaves substantially free passage to the fluid and a second position for which said movable vane is substantially transverse with respect to said conduit to restrict passage of the fluid between said stationary vane and the opposed side of said conduit.

4. In an apparatus as claimed in claim 3, said movable vane being mounted on a transverse spindle so as to act as a throttle valve in said conduit.

References Cited in the file of this patent
UNITED STATES PATENTS

| | | |
|---|---|---|
| 1,582,369 | Aske | Apr. 27, 1926 |
| 2,738,646 | Kadosch et al. | Mar. 20, 1956 |

FOREIGN PATENTS

| | | |
|---|---|---|
| 485,797 | Italy | Oct. 17, 1953 |
| 947,844 | Germany | Aug. 23, 1956 |
| 1,178,171 | France | Dec. 8, 1958 |
| 1,233,654 | France | May 9, 1960 |